US012698169B2

(12) United States Patent
Monte

(10) Patent No.: US 12,698,169 B2
(45) Date of Patent: Aug. 4, 2026

(54) SHEET FEEDING APPARATUS AND IMAGE FORMING APPARATUS

(71) Applicant: CANON KABUSHIKI KAISHA, Tokyo (JP)

(72) Inventor: Takafumi Monte, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/041,270

(22) Filed: Jan. 30, 2025

(65) Prior Publication Data

US 2026/0116683 A1 Apr. 30, 2026

(30) Foreign Application Priority Data

Feb. 21, 2024 (JP) ................................ 2024-024893

(51) Int. Cl.
*B65H 1/26* (2006.01)
*B65H 1/04* (2006.01)

(52) U.S. Cl.
CPC ............... *B65H 1/266* (2013.01); *B65H 1/04* (2013.01); *B65H 2402/60* (2013.01); *B65H 2405/121* (2013.01); *B65H 2405/332* (2013.01); *G03G 2215/00713* (2013.01)

(58) Field of Classification Search
CPC ...... B65H 1/04; B65H 1/266; B65H 2402/10; B65H 2402/40; B65H 2402/44; B65H 2402/60; B65H 2405/121; B65H 2405/31; B65H 2405/32; B65H 2405/332; G03G 2215/00713
See application file for complete search history.

(56) References Cited

U.S. PATENT DOCUMENTS

2009/0302521 A1* 12/2009 Kondo ............... G03G 15/6502 271/9.01
2019/0185279 A1* 6/2019 Ando ..................... B65H 5/062
2021/0094782 A1* 4/2021 Tanio ..................... B65H 1/266
2021/0255579 A1* 8/2021 Niwa ................ G03G 21/1647

FOREIGN PATENT DOCUMENTS

JP 2007297216 A 11/2007
JP 2018024510 A 2/2018
JP 2018070279 A 5/2018
JP 2019089632 A 6/2019
JP 2020114768 A 7/2020

* cited by examiner

*Primary Examiner* — Prasad V Gokhale
(74) *Attorney, Agent, or Firm* — ROSSI, KIMMS & McDOWELL LLP

(57) ABSTRACT

A sheet feeding apparatus includes a casing configured to be connected under an upper casing to which an upper storage portion is drawably attached, a storage portion drawably attached to the casing, and a lock mechanism configured to switch between a locked state, in which the lock mechanism locks the casing and the upper casing to prevent the casing and the upper casing from being separated from each other, and an unlocked state. In in a case where the lock mechanism is in the locked state, a whole of the lock mechanism is positioned outside a movement trajectory of the upper storage portion. In a case where the lock mechanism is in the unlocked state, at least a portion of the lock mechanism is positioned inside the movement trajectory of the upper storage portion.

20 Claims, 8 Drawing Sheets

SHEET FEEDING APPARATUS AND IMAGE FORMING APPARATUS

BACKGROUND OF THE INVENTION

Field of the Invention

The present invention relates to a sheet feeding apparatus that feeds sheets, and an image forming apparatus that forms images on sheets.

Description of the Related Art

An image forming apparatus, such as a printer, a copying machine, or a multi-function printer, includes a sheet storage portion that stores sheets used as a recording material. The sheet storage portion is drawably attached to a casing of the image forming apparatus. For achieving a large-capacity sheet storage portion and handling a variety of recording materials, an option feeding unit that can be connected to a lower portion of the image forming apparatus body is used if desired by a user. The option feeding unit can include a plurality of feeding units stacked on each other in the vertical direction and used for a single image forming apparatus body.

Japanese Patent Application Publication No. 2020-114768 describes a sheet feeding apparatus that includes a lock mechanism. The lock mechanism uses a hook that engages with the apparatus body of an image forming apparatus, and locks a frame of the apparatus body and a frame of the sheet feeding apparatus. The lock mechanism described in the document above includes an operation portion that can switch the state of the lock mechanism between a locked state and an unlocked state.

In the configuration described in the document above, if a user is not aware that the lock mechanism is in the unlocked state, the image forming apparatus may be used, after installed, in a state where the lock mechanism remains in the unlocked state. Thus, it has been desired that a user can easily recognize that the lock mechanism is in the unlocked state.

SUMMARY OF THE INVENTION

The present invention can provide a sheet feeding apparatus and an image forming apparatus that makes it easier to recognize that a lock mechanism is in an unlocked state.

According to an aspect of the invention, a sheet feeding apparatus includes a casing configured to be connected under an upper casing to which an upper storage portion is drawably attached, a storage portion configured to store a sheet and drawably attached to the casing, and a lock mechanism configured to switch between a locked state, in which the lock mechanism locks the casing and the upper casing to prevent the casing and the upper casing from being separated from each other, and an unlocked state, in which the lock mechanism allows the casing and the upper casing to be separated from each other, wherein in a case where the lock mechanism is in the locked state, a whole of the lock mechanism is positioned outside a movement trajectory of the upper storage portion in which the upper storage portion is attached to and drawn from the upper casing, and wherein in a case where the lock mechanism is in the unlocked state, at least a portion of the lock mechanism is positioned inside the movement trajectory of the upper storage portion.

According to another aspect of the invention, a sheet feeding apparatus includes a casing configured to be connected under an upper casing to which an upper storage portion is drawably attached, a storage portion configured to store a sheet and drawably attached to the casing, and a lock mechanism configured to switch between a locked state, in which the lock mechanism locks the casing and the upper casing to prevent the casing and the upper casing from being separated from each other, and an unlocked state, in which the lock mechanism allows the casing and the upper casing to be separated from each other, wherein the lock mechanism includes a lock member including an engaging portion configured to engage with an engaged portion provided in the upper casing, the lock member being configured to move such that the engaging portion approaches and moves away from the engaged portion, and wherein the lock member includes a contacted portion configured to be brought into contact with the upper storage portion in a case where the upper storage portion is moved in a state where the lock member is located at a position at which the engaging portion is separated from the engaged portion to a maximum extent.

According to another aspect of the invention, a sheet feeding apparatus includes a casing configured to be connected under an upper casing to which an upper storage portion is drawably attached, a storage portion configured to store a sheet and drawably attached to the casing, and a lock mechanism configured to switch between a locked state, in which the lock mechanism locks the casing and the upper casing to prevent the casing and the upper casing from being separated from each other, and an unlocked state, in which the lock mechanism allows the casing and the upper casing to be separated from each other, wherein in a case where the lock mechanism is in the locked state, a whole of the lock mechanism is positioned outside a movement trajectory of the storage portion in which the storage portion is attached to and drawn from the casing, and wherein in a case where the lock mechanism is in the unlocked state, at least a portion of the lock mechanism is positioned inside the movement trajectory of the storage portion.

Further features of the present invention will become apparent from the following description of exemplary embodiments with reference to the attached drawings.

DESCRIPTION OF THE EMBODIMENTS

Hereinafter, an embodiment of the present disclosure will be described with reference to the accompanying drawings.

First Embodiment

Figure 1:
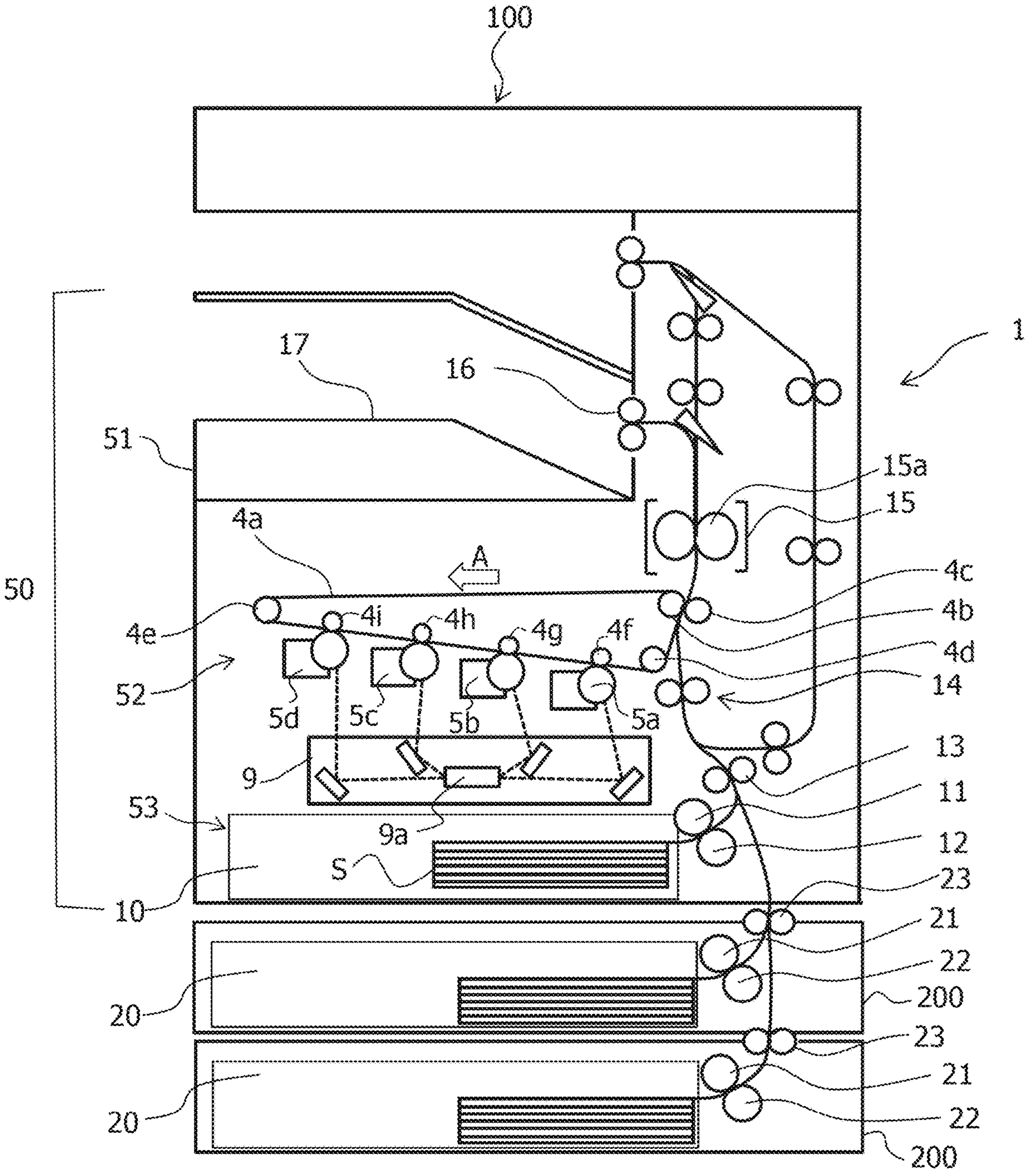
FIG. 1 is a schematic diagram of an image forming apparatus of a first embodiment.

FIG. 1 illustrates a schematic diagram illustrating a cross section of an image forming apparatus 1 of a first embodiment. The image forming apparatus 1 includes a printer unit 50, one or more option feeding units 200, and an image reading apparatus 100. The printer unit 50 includes an image forming portion 52 and serves as an image forming apparatus body: Each of the option feeding units 200 supplies a sheet S to the printer unit 50.

In a case where a single option feeding unit 200 is used, the option feeding unit 200 is connected under the printer unit 50, and functions as a sheet feeding apparatus that feeds the sheet S to the printer unit 50. In a case where a plurality of option feeding units 200 is used, the option feeding units are connected under the printer unit 50, one stacked on another, and function as sheet feeding apparatuses that feed the sheet S to the printer unit 50. Each of the option feeding units 200 is a feeding unit that constitutes the sheet feeding apparatus. In a case where the image forming apparatus 1 includes the plurality of option feeding units 200, any one of the option feeding units 200 is referred to as a first feeding unit, and another one of the option feeding units 200 is referred to as a second feeding unit. The configuration of the option feeding unit 200 will be described later.

The image forming portion 52 of the present embodiment is an intermediate-transfer electrophotographic unit that includes four process cartridges 5*a*, 5*b*, 5*c*, and 5*d*, and an intermediate transfer unit 4. The four process cartridges use corresponding four types of toner of black, cyan, magenta, and yellow; and form corresponding toner images. The image forming portion 52 also includes a laser scanner 9 that serves as an exposure apparatus, and a fixing apparatus 15.

Each of the process cartridges 5*a* to 5*d* includes a photosensitive drum that serves as an image bearing member, and one or more process portions that act on the photosensitive drum for executing the processes of the electrophotographic process. The process cartridges 5*a* to 5*d* are detachably attached to a casing (i.e., a main-body casing 51) of the printer unit 50. In the present embodiment, the process portions included in each of the process cartridges 5*a* to 5*d* are, for example, a charging roller that serves as a charging member, and a developing roller that serves as a developing member. In addition, each of the process cartridges 5*a* to 5*d* contains toner of black, cyan, magenta, or yellow; which is used as developer.

The laser scanner 9 includes a laser light source and an exposure optical system. The exposure optical system includes a polygon mirror 9*a*; and emits the laser beam outputted from the laser light source, to the four photosensitive drums. Note that the exposure apparatus may be an LED exposure apparatus in which LEDs are arranged in the main scanning direction (i.e., the rotation-axis direction of the photosensitive drum).

The intermediate transfer unit 4 includes an intermediate transfer belt 4*a* which serves as an intermediate transfer member, a plurality of rollers (4*b*, 4*d*, 4*e*) which the intermediate transfer belt 4*a* is stretched by and wound around, a secondary transfer roller 4*c*, and primary transfer rollers 4*f*, 4*g*, 4*h*, and 4*i*. The intermediate transfer belt 4*a* of the present embodiment is stretched by and wound around a driving roller 4*b*, an idler roller 4*d*, and a tension roller 4*e*; and is driven and rotated by the driving roller 4*b* in a direction indicated by an arrow A in FIG. 1. The primary transfer rollers 4*f* to 4*i* are disposed at positions that face the respective photosensitive drums of the process cartridges 5*a* to 5*d*, via the intermediate transfer belt 4*a*. The secondary transfer roller 4*c* is disposed such that the intermediate transfer belt 4*a* is nipped by the secondary transfer roller 4*c* and the driving roller 4*b* (i.e., a secondary transfer inner roller). Thus, a transfer portion (i.e., a secondary transfer portion) in which a toner image is transferred to the sheet S is formed as a nip portion between the intermediate transfer belt 4*a* and the secondary transfer roller 4*c*.

The fixing apparatus 15 includes a rotary member pair 15*a* that nips and conveys the sheet S, and a heating portion that heats the toner image formed on the sheet S. The rotary member pair 15*a* is constituted by a fixing member (i.e., a heating member) that heats the toner image, and a pressing member that is in pressure contact with the fixing member. Each of the fixing member and the pressing member may be a cylindrical roller, a film unit which includes a tubular film, or a belt unit in which an endless belt is stretched by and wound around a plurality of rollers. The heating portion may be a ceramic heater in which a pattern of a heat generating resistor is printed on a ceramic substrate, a halogen lamp which generates radiant heat, or an induction-heating coil unit that causes a conductive layer of the fixing member to generate heat due to electromagnetic induction.

The printer unit 50 includes the main-body casing 51 that accommodates the image forming portion 52, an in-body feeding unit 53 disposed in the main-body casing 51, a plurality of conveyance members (13, 14, 16) that conveys the sheet S, and a discharging tray 17 that serves as a stacking portion on which the sheet S is stacked.

The main-body casing 51 includes a metal frame that constitutes the frame of the printer unit 50, and a cover member that forms the exterior surface of the printer unit 50.

The in-body feeding unit 53 includes a sheet cassette 10 and a feeding portion (11, 12). The sheet cassette 10 is drawably attached to the main-body casing 51. The feeding portion feeds the sheet S, one by one, from the sheet cassette 10. The sheet cassette 10 is a sheet storage portion (i.e., a storage or a sheet tray) that stores the sheet S. In the sheet cassette 10, the sheet S is stored, stacked on each other. The feeding portion of the present embodiment includes a feeding roller 11 that feeds the sheet S from the sheet cassette 10, and a separation roller 12 that is abutted against the feeding roller 11. The separation roller 12, together with the feeding roller 11, forms a separation nip.

In the present embodiment, the plurality of conveyance members includes a conveyance roller pair 13, a registration roller pair 14 disposed immediately before the secondary transfer portion, and a discharging roller pair 16 disposed downstream of the fixing apparatus 15.

The image reading apparatus 100 includes a document platen glass on which a document sheet is placed, and a reading portion (i.e., an image sensor) which reads an image of a document sheet via the document platen glass. The image reading apparatus 100 is disposed above the printer unit 50, and fixed to the top surface of the main-body casing 51.

Image Forming Operation

Next, a flow of an image forming operation will be described. The image forming operation is a series of operations that forms an image on the sheet S while the image forming apparatus 1 conveys the sheet S one by one.

In the image forming operation, the photosensitive drum of each of the process cartridges 5*a* to 5*d* and the intermediate transfer belt 4$a$ are driven and rotated. The surface of the photosensitive drum is charged by the charging roller. The laser scanner 9 emits the laser beam to the photosensitive drum in accordance with image information that is read by the image reading apparatus 100 or sent from an external computer. As a result, the photosensitive drum is exposed, and an electrostatic latent image is formed on the surface of the photosensitive drum. The developing roller bears toner and supplies the toner to the photosensitive drum, and develops the electrostatic latent image into a toner image.

The toner image formed on the surface of each of the photosensitive drums is primary-transferred onto the intermediate transfer belt 4$a$ by a corresponding one of the primary transfer rollers 4$f$ to 4$i$. In this operation, multiple transfer is performed so that one of the four-color toner images is put on another, so that a full-color toner image is formed on the intermediate transfer belt 4$a$. The full-color toner image is borne by the intermediate transfer belt 4$a$, and conveyed toward the secondary transfer portion.

On the other hand, the sheet S is fed, one by one, from the in-body feeding unit 53 (or the option feeding unit 200). The sheet S that has passed through the separation nip is sent to the registration roller pair 14 through the conveyance roller pair 13. The leading edge of the sheet S is abutted against the registration roller pair 14 that is in a stop state, so that the skew of the sheet S is corrected. After that, the registration roller pair 14 sends the sheet S into the secondary transfer portion at a timing at which the toner image is conveyed to the secondary transfer portion. In the secondary transfer portion, the toner image is secondary-transferred from the intermediate transfer belt 4$a$ to the sheet S.

The sheet S that has passed through the secondary transfer portion is subjected to the fixing process by the fixing apparatus 15. The fixing apparatus 15 heats and presses the toner image formed on the sheet S, while nipping and conveying the sheet S in the nip portion (i.e., a fixing nip) of the rotary member pair 15$a$. With this operation, an image fixed to the sheet S can be obtained. The sheet S that has passed through the fixing apparatus 15 is discharged to the outside of the main-body casing 51 by the discharging roller pair 16, and stacked on the discharging tray 17, as a product.

Option Feeding Unit

Figure 2B:
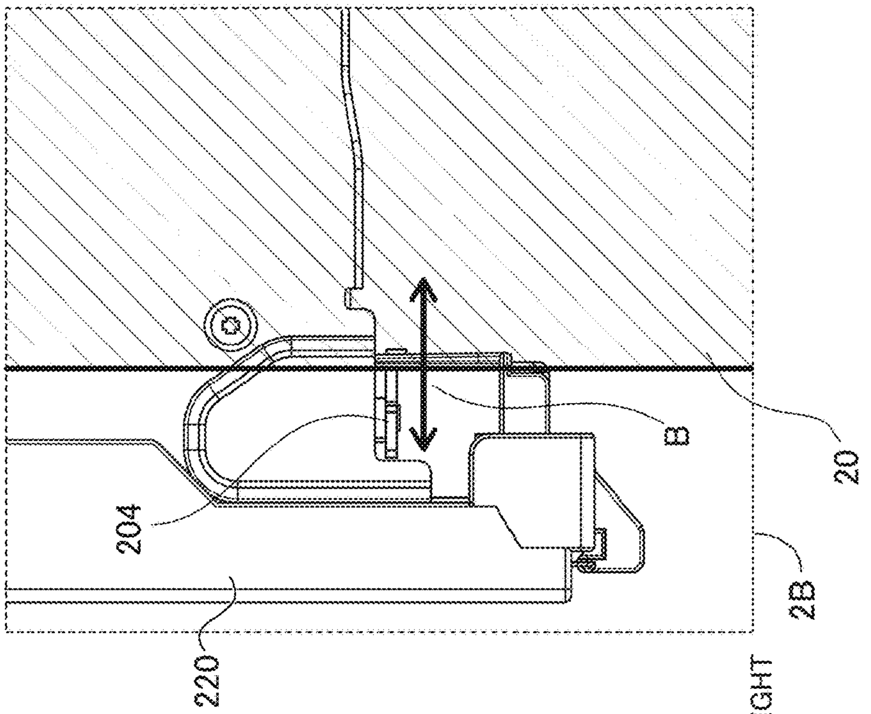
FIG. 2B is an enlarged view in which a portion of FIG. 2A is enlarged.
Figure 2A:
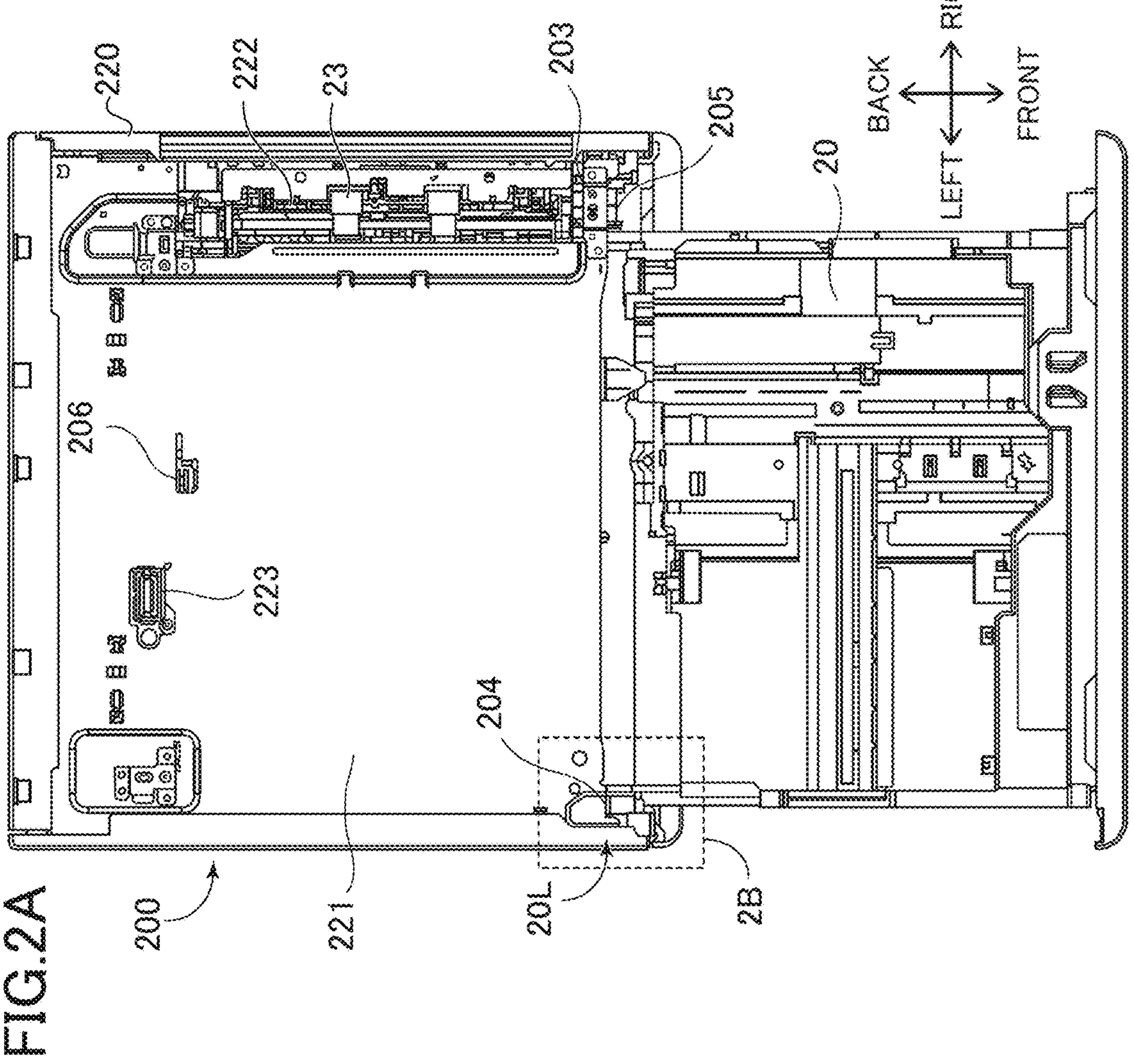
FIG. 2A is a top view of an option feeding unit of the first embodiment.
Figure 3:
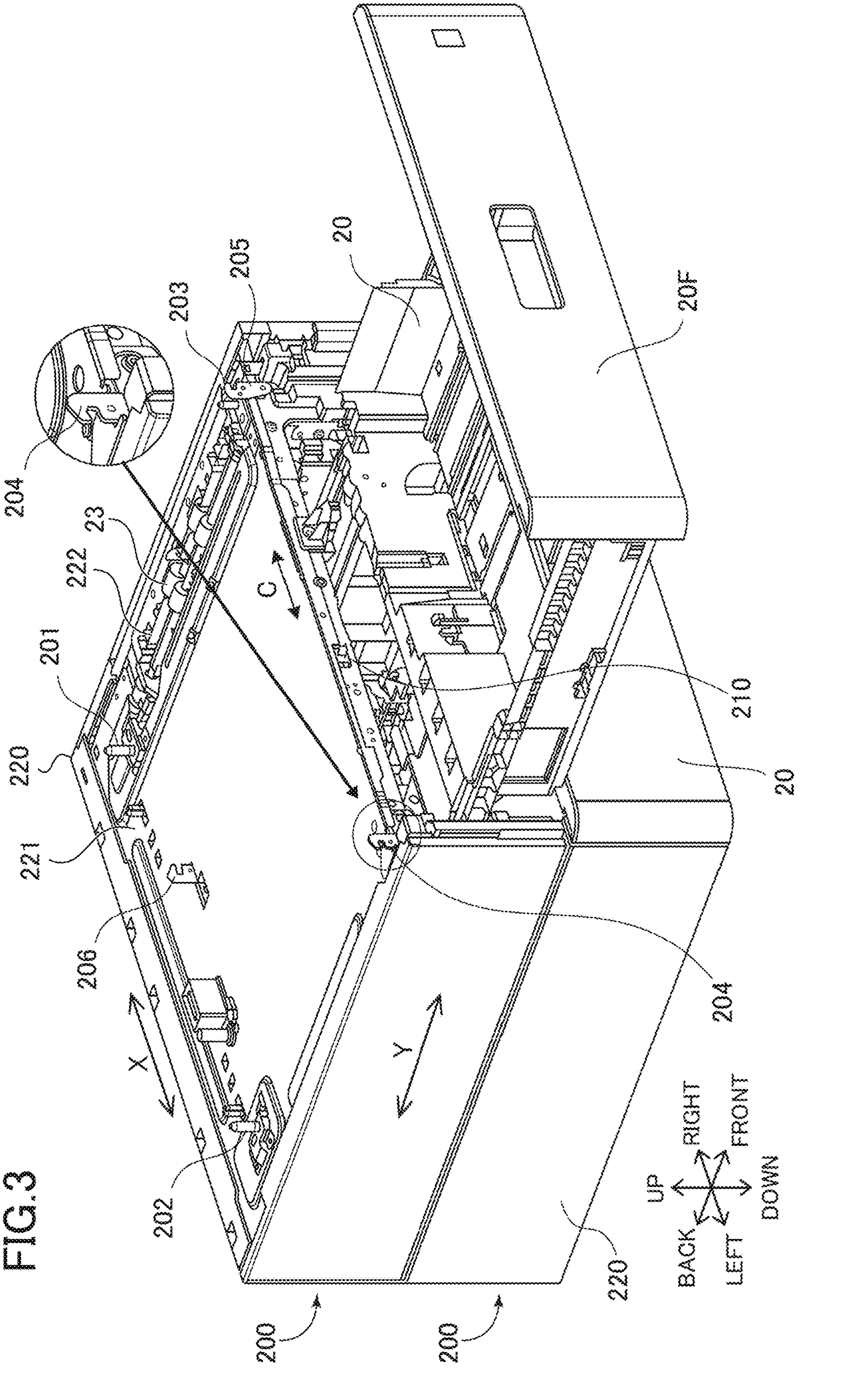
FIG. 3 is a perspective view of the option feeding unit of the first embodiment.

FIG. 2A is a diagram of the option feeding unit 200 viewed from above. FIG. 2B is an enlarged view in which a portion 2B of FIG. 2A is enlarged. FIG. 3 is a perspective view of the option feeding unit 200. An upper-right circle in FIG. 3 is an enlarged view in which a portion of the perspective view is enlarged. Each of FIGS. 2A and 3 illustrates two option feeding units 200 stacked on each other in the vertical direction, and illustrates a state where a sheet cassette 20 of the upper option feeding unit 200 is drawn from the upper option feeding unit 200.

In the following description and each drawing, the vertical downward direction (i.e., the gravity direction) in a state where the image forming apparatus 1 is installed on a horizontal plane is referred to as a downward direction, the vertical upward direction in a state where the image forming apparatus 1 is installed on a horizontal plane is referred to as an upward direction, and the downward direction and the upward direction are collectively referred to as an up and down direction. A horizontal direction (i.e., a drawing direction) which is orthogonal to the up and down direction and in which the sheet cassette 20 is drawn is referred to as a front direction. A horizontal direction (i.e., an attachment direction) in which the sheet cassette 20 is inserted is referred to as a back direction. The front direction and the back direction are collectively referred to as a front and back direction. A horizontal direction on the left side of the image forming apparatus 1 or the option feeding unit 200 viewed from the front side is referred to as a left direction. A horizontal direction on the right side of the image forming apparatus 1 or the option feeding unit 200 viewed from the front side is referred to as a right direction. The right direction and the left direction are collectively referred to as a right and left direction.

As illustrated in FIGS. 2A and 3, each of the option feeding units 200 includes a casing 220, the sheet cassette 20, a feeding portion (FIG. 1) that includes a feeding roller 21 and a separation roller 22, a conveyance roller pair 23, and a lock mechanism 20L.

The casing 220 includes a metal frame that constitutes the frame of the option feeding unit 200, and a cover member that forms the exterior surface of the option feeding unit 200.

The sheet cassette 20 is a sheet storage portion (i.e., a storage or a sheet tray) that stores the sheet S. The sheet cassette 20 includes a cassette body which is substantially box-shaped, and whose upper side is opened. In the cassette body; a storage space for the sheet S is formed. The sheet S is stored in the storage space, stacked on each other. In addition, in the sheet cassette 20, a regulation member and a lifting-and-lowering plate (i.e., a sheet supporting portion) are disposed. The regulation member regulates the position of the sheet S. The lifting-and-lowering plate supports the lower surface of the sheet S, and lifts and lowers the sheet S.

The sheet cassette 20 is drawably attached to the casing 220. That is, the sheet cassette 20 can move between a drawn position (i.e., the position illustrated in FIG. 2A or the position of the upper sheet cassette 20 illustrated in FIG. 3) to which the sheet cassette 20 is drawn from the casing 220, and an attachment position (i.e., the position of the lower sheet cassette 20 illustrated in FIG. 3) at which the sheet cassette 20 is attached to the casing 220. The casing 220 includes a guiding portion (i.e., a guide rail) that guides a guided portion of the sheet cassette 20 so that the sheet cassette 20 slides on the casing 220 in a slide direction substantially parallel to the front and back direction.

In a state where the sheet cassette 20 is positioned in the drawn position, at least a portion of the storage space of the sheet cassette 20 is exposed to the outside of the casing 220, and a user can supply or replace the sheet S. In a state where the sheet cassette 20 is positioned in the attachment position, the option feeding unit 200 can perform the feeding operation for feeding the sheet S from the sheet cassette 20, and the image forming apparatus 1 can perform the image forming operation on the sheet S fed from the sheet cassette 20.

The feeding portion of the present embodiment includes the feeding roller 21 that feeds the sheet S from the sheet cassette 20, and the separation roller 22 that is abutted against the feeding roller 21. The separation roller 22 forms a separation nip. In the separation nip, the separation roller 22 applies frictional force to the sheet S in a direction opposite to the sheet feeding direction. Thus, in a case where a plurality of sheets S moves into the separation nip, the separation roller 22 prevents the sheets other than the uppermost sheet S from passing through the separation nip. That is, the feeding portion feeds the sheet S, one by one, from the sheet cassette 10. The above-described feeding portion is one example. For example, a pickup roller may be additionally disposed on the upstream side of the feeding roller 21, for sending the sheet S from the sheet cassette 20 toward the feeding roller 21. The separation roller 22 is one example of a separation member that separates the sheet S. For example, a pad-like friction member (e.g., a rubber pad) that abuts against the feeding roller 21 may be used as the separation member.

The conveyance roller pair 23 is disposed in a discharge port 222 that is an opening portion formed in a top surface 221 of the casing 220. In addition, the conveyance roller pair 23 is disposed on a conveyance path that passes through the casing 220 from a bottom surface to the top surface 221 of the casing 220. Thus, the conveyance roller pair 23 illustrated in FIGS. 2A and 3 can convey not only the sheet S fed from the upper sheet cassette 20, but also the sheet S fed from the lower sheet cassette 20.

Hereinafter, a feeding operation performed in a case where the sheet cassette 20 of the option feeding unit 200 is used, in the above-described image forming operation, as a supply source of the sheet S will be described. The sheet S stored in the sheet cassette 20 is fed by the feeding roller 21 being rotated in a counterclockwise direction in FIG. 1. One sheet S that has passed through the separation nip is conveyed to the conveyance path, formed in the printer unit 50, through the discharge port 222 and a taking-in port of the printer unit 50 by the conveyance roller pair 23; and is then conveyed toward the conveyance roller pair 13. The operations performed after this operation are the same as those performed in a case where the sheet S is conveyed from the in-body feeding unit 53.

Configuration of Top Surface of Casing

As illustrated in FIG. 3, in the top surface 221 of the casing 220 of the option feeding unit 200, components for connecting the option feeding unit 200 to the printer unit 50 or another option feeding unit 200 (i.e., an upper unit) are disposed. The top surface 221 of the casing 220 is a surface that faces the bottom surface of the printer unit 50 connected to the option feeding unit 200, or the bottom surface of the other option feeding unit 200 connected to the option feeding unit 200.

In the present embodiment, in the top surface 221 of the casing 220, positioning pins 201, 202, and 203, lock members 204, 205, and 206, the above-described discharge port 222, and a connector 223 are disposed.

Each of the pins 201 to 203 has a positioning shape for determining the relative position between the printer unit 50 and the option feeding unit 200. Each of the pins 201 to 203 projects upward. In the bottom surface of the main-body casing 51 of the printer unit 50, hole portions are formed at positions corresponding to the pins 201 to 203. The hole portions are recessed upward.

In a case where the printer unit 50 is placed on the option feeding unit 200, the pins 201 to 203 that serve as engaging portions engage with the hole portions that serve as engaged portions. In this manner, the relative position between the printer unit 50 and the option feeding unit 200 is determined in the front and back direction (indicated by an arrow Y) and the right and left direction (indicated by an arrow X). In addition, hole portions that are recessed upward are formed also in the bottom surface of the casing 220 of the option feeding unit 200 at positions corresponding to the pins 201 to 203 of another option feeding unit 200. In this manner, in a case where the option feeding unit 200 is stacked on another option feeding unit 200, the hole portions that serve as engaged portions engage with the pins 201 to 203 of the other option feeding unit 200 that serve as engaging portions, and the relative position between the option feeding unit 200 and the other option feeding unit 200 is determined in the front and back direction (indicated by an arrow Y) and the right and left direction (indicated by an arrow X).

Note that although the description has been made, in the present embodiment, for the case where the engaging portions are pins (i.e., projection portions) and the engaged portions are hole portions (i.e., recess portions), the engaging portions may be hole portions (i.e., recess portions) and the engaged portions may be pins (i.e., projection portions) that engage with the hole portions. In addition, the shape of the projection portions may not be the shape of pins (i.e., axial members) that extend in the up and down direction, and the shape of the recess portions may not be the shape of cylindrical holes. That is, the projection portions and the recess portions have only to have their shapes that can prevent the printer unit 50 and the option feeding unit 200 from moving relatively to each other in at least one of the front and back direction and the right and left direction.

In the present embodiment, the pins 201 to 203 are disposed at three positions in total: two positions on the right side in the front and the back of the casing 220, and one position on the left side in the back of the casing 220. In this arrangement, the relative position between the printer unit 50 and the option feeding unit 200 can be determined with high accuracy: The pins 201 and 203 are disposed at the two positions on the right side of the casing 220, on which side the discharge port 222 for the sheet S is formed. Specifically; the pins 201 and 203 are disposed on the right side in the front and the back of the casing 220. Thus, the positional accuracy of the discharge port 222 with respect to the taking-in port of the printer unit 50 or another option feeding unit 200 can be increased, and the sheet S can be received/sent smoothly from/to the printer unit 50 or the other option feeding unit 200. However, the number and the arrangement of each of the pins 201 to 203 (i.e., the engaging portions) and the hole portions (i.e., the engaged portions) may be changed as appropriate in accordance with a specific configuration of the image forming apparatus 1.

The connector 223 is connected with a main-body-side connector disposed in the printer unit 50. The option feeding unit 200 is electrically connected with a circuit of the printer unit 50 via the connector 223, so that the option feeding unit 200 can be supplied with electric power and can receive a control signal. In addition, in the bottom surface of the casing 220 of the option feeding unit 200, a connector insertion portion is disposed. The connector insertion portion has a shape that enables the connector insertion portion to engage with the connector 223 of another option feeding unit 200. Thus, in a case where the option feeding unit 200 is stacked on another option feeding unit 200, the connector 223 and the connector insertion portion are connected to each other, and the lower option feeding unit 200 is electrically connected with the printer unit 50 via the upper option feeding unit 200.

The lock members 204 to 206 are disposed so as to project upward from the top surface 221 of the casing 220. In the present embodiment, the lock members 204 to 206 are disposed at three positions in total: two positions on the front side of the casing 220, positioned at both edges in the right and left direction, and one position positioned at substantially the center on the back side of the casing 220. At least one of the lock members 204 to 206 is disposed such that a space in which the sheet cassette 20 moves when drawn from and attached to the casing 220 overlaps with a space B (FIG. 2B) in which the lock member can move.

The lock members 204 to 206 are part of the lock mechanism 20L that locks the printer unit 50 and the option feeding unit 200. The lock mechanism 20L and the overlap between the space in which the lock member can move and the space in which the sheet cassette 20 moves will be described in detail below.

Lock Mechanism

Figure 4A:
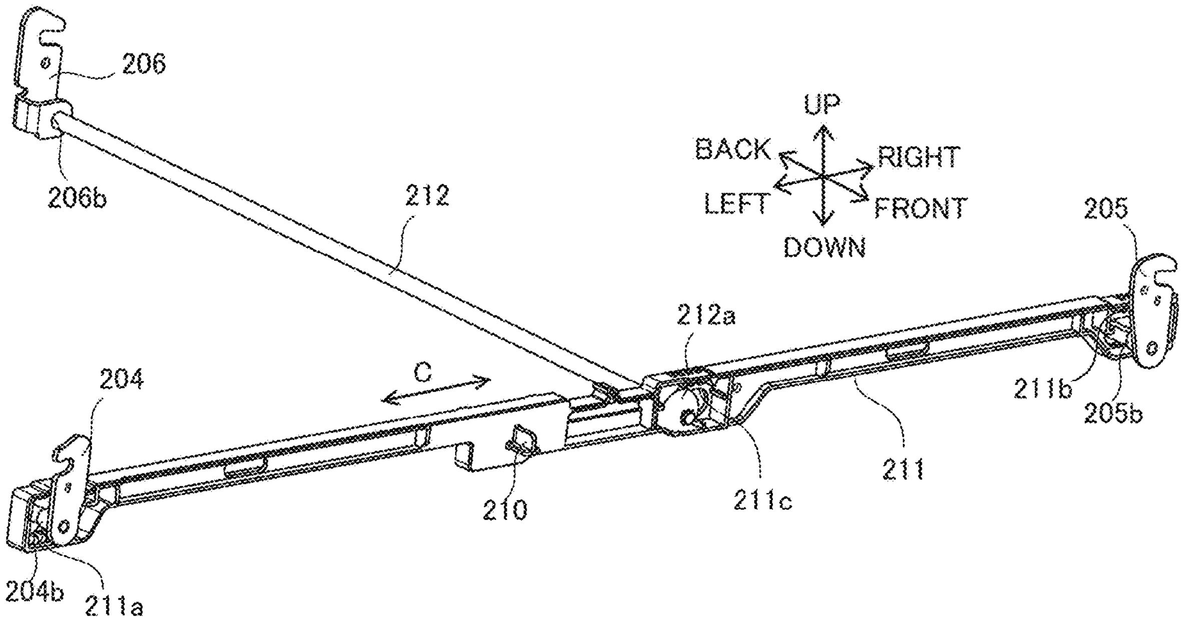
FIG. 4A is a perspective view of a lock mechanism of the first embodiment.
Figure 4B:
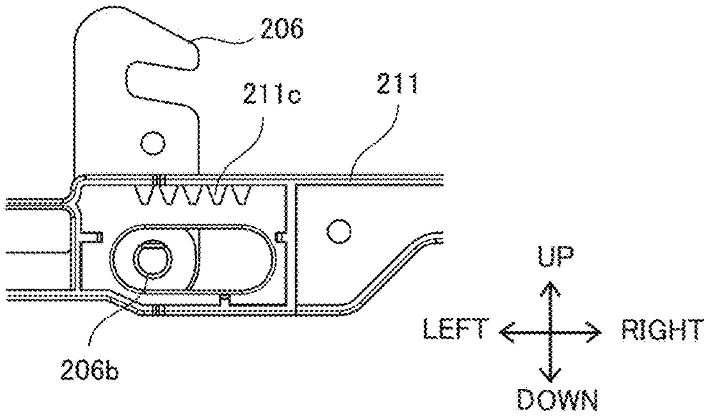
FIG. 4B is a diagram illustrating a portion of the lock mechanism.
Figure 5:
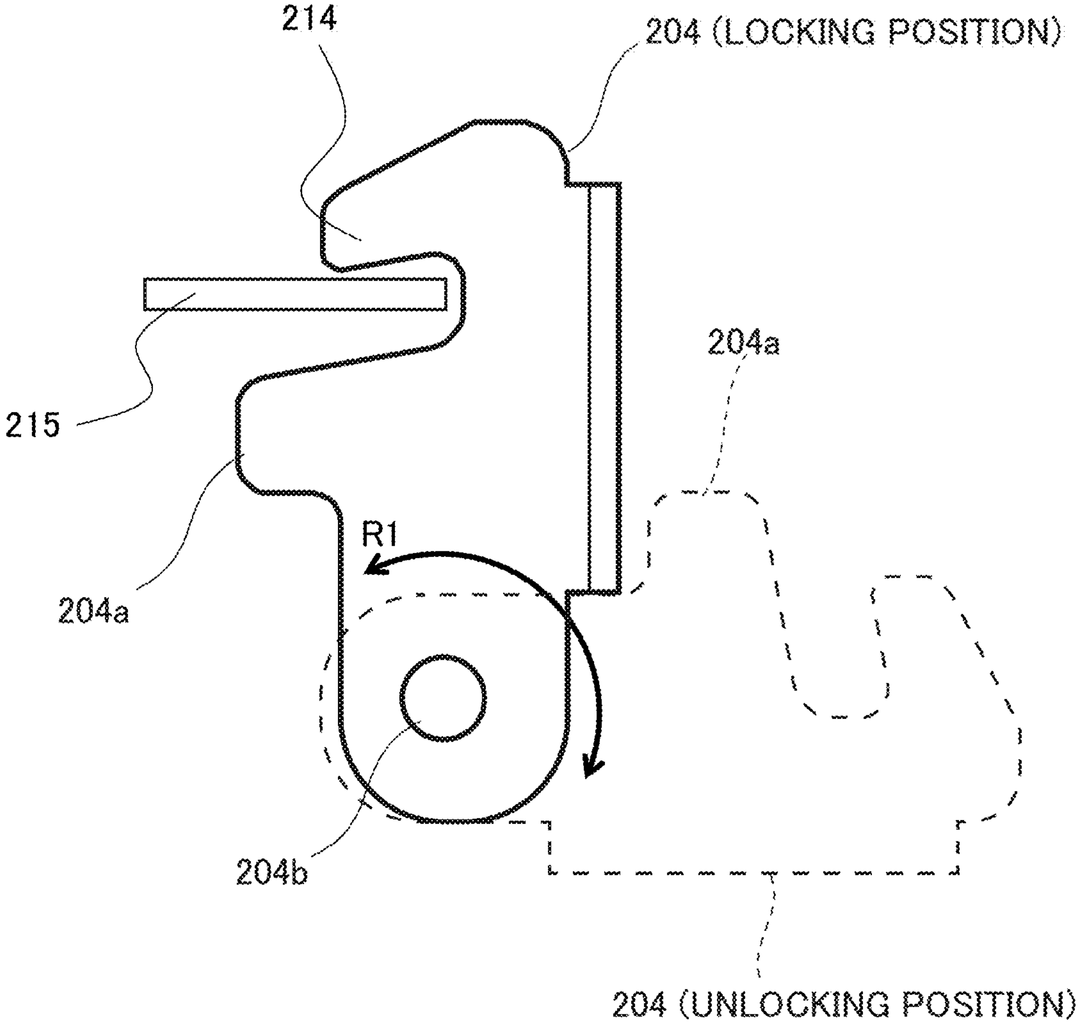
FIG. 5 is a diagram illustrating a lock member of the first embodiment.

Next, the lock mechanism 20L of the present embodiment will be described. FIG. 4A is a perspective view of the lock mechanism 20L. FIG. 4B is a front view in which a portion of the lock mechanism 20L is viewed from the front side. FIG. 5 is a schematic diagram illustrating a range in which the lock member 204 can move.

As illustrated in FIG. 4A, the lock mechanism 20L includes the lock members 204 to 206, an operation lever 210, a slider 211, and a connecting rod 212.

As illustrated in FIG. 5, the lock member 204 includes a claw portion (hook portion) 214 that serves as an engaging portion that engages with the printer unit 50 or another option feeding unit 200. The printer unit 50 includes an engaged portion 215 engaged with the claw portion 214. The engaged portion 215 is a portion of the main-body casing 51. Specifically, the engaged portion 215 is a portion of the frame of the printer unit 50, or a member fixed to the frame. The casing 220 of the option feeding unit 200 also includes an engaged portion engaged with the claw portion 214 of another option feeding unit 200.

In FIG. 5, only the single lock member 204 is illustrated. However, each of the other lock members 205 and 206 also includes the claw portion 214 identical to that of the lock member 204. Thus, each of the printer unit 50 and another option feeding unit 200 includes an engaged portion engaged with the claw portion 214 of the lock member 205, and an engaged portion engaged with the claw portion 214 of the lock member 206.

Each of the lock members 204 to 206 can move between an engagement position (or a locking position indicated by a solid line in FIG. 5) at which the claw portion 214 engages with the engaged portion 215, and a separation position (or an unlocking position indicated by a broken line in FIG. 5) at which the claw portion 214 is separated from the engaged portion 215. That is, the lock members 204 to 206 can move such that the claw portion 214 approaches and moves away from the engaged portion 215. The state where the lock members 204 to 206 are positioned in the engagement position is referred to as a locked state of the lock mechanism 20L, and the state where the lock members 204 to 206 are positioned in the separation position is referred to as an unlocked state of the lock mechanism 20L.

The lock members 204, 205, and 206 of the present embodiment move between the engagement position and the separation position by respectively pivoting around pivot shafts 204*b*, 205*b*, and 206*b* (FIG. 4A). In the present embodiment, the axial direction of each of the pivot shafts 204*b*, 205*b*, and 206*b* is a direction in which the sheet cassette 20 is attached to and drawn from the casing 220 (that is, the front and back direction). Note that part or all of the lock members 204 to 206 may move between the engagement position and the separation position by not pivoting but moving linearly (or sliding), for example.

The slider 211 is narrow and elongated in the right and left direction of the apparatus. The slider 211 is supported by the casing 220 so as to move back and forth (slide) in a slide direction C that crosses the drawing direction of the sheet cassette 20. The slider 211 of the present embodiment moves back and forth in the right and left direction. One end of the slider 211 is provided with a driving portion 211*a* that drives the lock member 204, and the other end of the slider 211 is provided with a driving portion 211*b* that drives the lock member 205. The driving portion 211*a* of the present embodiment has a shape of a rack that meshes with a gear disposed on the pivot shaft 204*b*, and the driving portion 211*b* of the present embodiment has a shape of a rack that meshes with a gear disposed on the pivot shaft 205*b*. Each of the driving portions 211*a* and 211*b* may not have a rack shape. In this case, the driving portion has only to abut against a corresponding lock member or a member that is formed integrally with the lock member and that moves together with the lock member, and move the lock member between the engagement position and the separation position.

Since the arrangement of the driving portion 211*a* and the arrangement of the driving portion 211*b* are different from each other in the up and down direction, the pivot direction of the lock member 204 and the pivot direction of the lock member 205 are constantly opposite to each other. That is, if the slider 211 is slid toward the left direction in the state illustrated in FIG. 4A, the lock members 204 and 205 fall over toward the center side in the right and left direction, and move from the engagement position to the separation position. After that, if the slider 211 is slid toward the right direction, the lock member 204 pivots toward the left side and the lock member 205 pivots toward the right side, moving from the separation position to the engagement position.

The connecting rod 212 is narrow and elongated in the front and back direction of the apparatus. One end of the connecting rod 212 is provided with a gear 212*a* that meshes with a rack portion 211*c* disposed on the slider 211. The other end of the connecting rod 212 is the pivot shaft 206*b* of the lock member 206. The rack portion 211*c* and the gear 212*a* mesh with each other. Thus, if the slider 211 is moved, the connecting rod 212 rotates, and the lock member 206, together with the connecting rod 212, pivots between the engagement position and the separation position. Note that as long as the lock member 206 can be moved between the engagement position and the separation position by operating the operation lever 210, the configuration for moving the lock member 206 is not limited to the configuration in which the lock member 206 is moved via the rack portion 211*c*, the gear 212*a*, and the connecting rod 212.

The operation lever 210 is an operation portion that can switch the state of the lock mechanism 20L between the locked state and the unlocked state. The operation lever 210 of the present embodiment is formed integrally with the slider 211. The operation lever 210 and the slider 211 can move in the right and left direction, between a locking position for setting the state of the lock mechanism 20L to the locked state and an unlocking position for setting the state of the lock mechanism 20L to the unlocked state.

A user can operate the lock mechanism 20L by pinching the operation lever 210 and moving the operation lever 210 rightward or leftward in a state where the sheet cassette 20 is drawn out (FIG. 3). Specifically; if a user moves the operation lever 210 toward the left direction, each of the lock members 204 to 206 moves from the engagement position to the separation position, and the state of the lock mechanism 20L is changed from the locked state to the unlocked state. In contrast, if a user moves the operation lever 210 toward the right direction, each of the lock members 204 to 206 moves from the separation position to the engagement position, and the state of the lock mechanism 20L is changed from the unlocked state to the locked state.

If each of the lock members 204 to 206 engages with the corresponding engaged portion 215 (FIG. 5) of the printer unit 50, the lock mechanism 20L in the locked state prevents the printer unit 50 from being removed (separated) upward from the option feeding unit 200. If the lock mechanism 20L is in the unlocked state, each of the lock members 204 to 206 is separated from the corresponding engaged portion 215 (FIG. 5) of the printer unit 50. In this case, the lock mechanism 20L allows the printer unit 50 to be removed (separated) upward from the option feeding unit 200.

Note that if an upper option feeding unit 200 is connected to the option feeding unit 200, the lock mechanism 20L in the locked state prevents the upper option feeding unit 200 from being removed (separated) upward from the lower option feeding unit 200. In addition, the lock mechanism 20L in the unlocked state allows the upper option feeding unit 200 to be removed (separated) upward from the lower option feeding unit 200.

Note that the shape of the claw portion 214 of each of the lock members 204 to 206, the position of the center of pivot of each of the lock members 204 to 206, the shape of the engaged portion 215, and the like are set so that when the claw portion 214 of each of the lock members in the engagement position is applied with upward force, the lock member does not move to the separation position. For example, in a case where a user makes an attempt to lift the printer unit 50 in a state illustrated in FIG. 5 and the engaged portion 215 presses the claw portion 214 upward, the moment applied to the lock member 204 is produced around the pivot shaft 204*b* by the force applied to the claw portion 214. The moment is applied to the lock member 204 in a direction RI from the separation position toward the engagement position. Thus, it can be prevented that the lock members 204 to 206 move to the separation position, and that the apparatuses are unintentionally unlocked from each other. Contacting Portion of Sheet Cassette By the way; it is supposed that the image forming apparatus 1 of the present embodiment be used after the printer unit 50 is connected with the option feeding unit 200 and the lock mechanism 20L is locked when the image forming apparatus 1 is installed. If the image forming apparatus 1 is used in a state where the lock mechanism 20L remains in the unlocked state, the stability (i.e., resistance to falling over) of the printer unit 50 to the external force applied to the image forming apparatus 1 is made lower than that of the intended design.

For this reason, it is preferable to be easily recognized that the lock mechanism 20L is in the unlocked state.

In particular, in the present embodiment, the operation lever 210 is disposed inside the option feeding unit 200 for downsizing the option feeding unit 200. That is, when viewed from the front side of the option feeding unit 200 in a state where the sheet cassette 20 is closed, the operation lever 210 is located in a position in which the operation lever 210 is covered by the front cover 20F (FIG. 3) of the sheet cassette 20. Thus, if a user installs the image forming apparatus 1 and finishes the installation without being aware that the operation lever 210 is located in the separation position, the image forming apparatus 1 will be used in a state where the lock mechanism 20L remains in the unlocked state.

Thus, in the present embodiment, as described below; a contacting portion 20*a* is disposed on the sheet cassette 20. The contacting portion 20*a* contacts a portion of the lock mechanism 20L when the sheet cassette 20 is drawn from or attached to the casing 220 in a state where the lock mechanism 20L is in the unlocked state. In the present embodiment, if the contacting portion 20*a* and a portion of the lock mechanism 20L contact each other in a state where the lock mechanism 20L is in the unlocked state, the sheet cassette 20 is prevented from being drawn from and attached to the casing 220.

Figure 6:
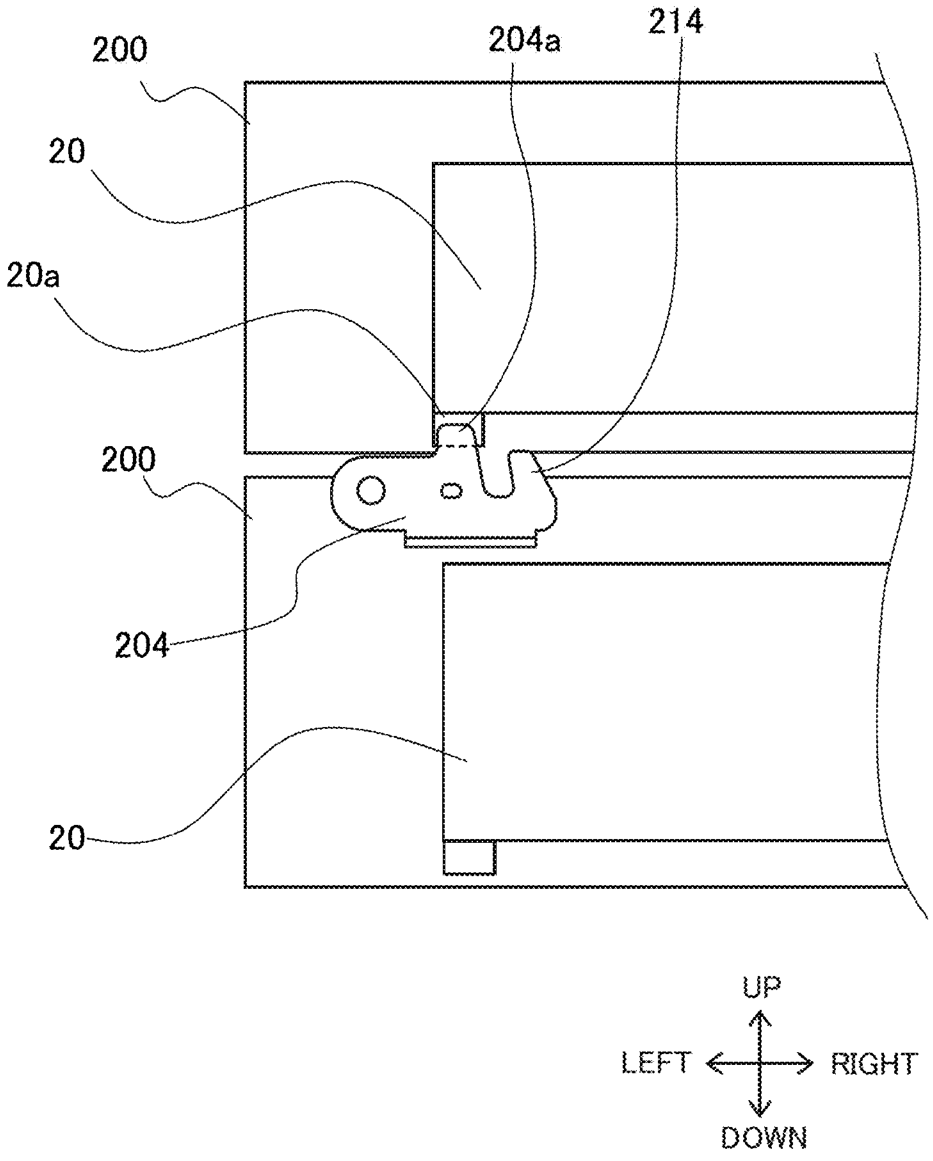
FIG. 6 is a diagram illustrating a contacting portion of a sheet cassette of the first embodiment.

FIG. 6 is a diagram illustrating the contacting portion 20*a* disposed on the sheet cassette 20. The contacting portion 20*a* of the present embodiment is disposed at a position at which when viewed in the moving direction of the sheet cassette 20 (i.e., the front and back direction of the apparatus), the contacting portion 20*a* overlaps with the lock member 204 of the lower option feeding unit 200 that is located in the separation position. In other words, at least a portion of the lock member 204 that is located in the separation position is put in a movement trajectory (i.e., a space through which the sheet cassette 20 passes) in which the upper sheet cassette 20 is attached to and drawn from the casing 220. That is, the contacting portion 20*a* of the upper sheet cassette 20 is disposed so as to contact the lock member 204 in a case where the upper sheet cassette 20 is moved in a state where the lock mechanism 20L of the lower option feeding unit 200 is in the unlocked state.

In other words, the upper option feeding unit 200 (i.e., a first feeding unit or an upper unit) includes the casing 220 (i.e., a first casing or an upper casing) and the sheet cassette 20 (i.e., a first storage portion or an upper storage portion). The lower option feeding unit 200 (i.e., a second feeding unit) includes the casing 220 (i.e., a second casing) connected under the upper casing 220, the sheet cassette 20 (i.e., a second storage portion), and the lock mechanism 20L. The lock mechanism 20L has the locked state and the unlocked state. In the locked state, the lock mechanism 20L locks the upper casing 220 (i.e., the first casing or the upper casing) and the lower casing 220 (i.e., the second casing or the casing) for preventing the casings from being separated from each other. In the unlocked state, the lock mechanism 20L allows the upper casing 220 and the lower casing 220 to be separated from each other. The sheet cassette 20 (i.e., the first storage portion) of the upper option feeding unit 200 includes the contacting portion 20*a* that contacts a portion of the lock mechanism 20L in a case where the sheet cassette 20 (i.e., the first storage portion) is moved in a state where the lock mechanism 20L is in the unlocked state.

Thus, in a case where the lock mechanism 20L is in the unlocked state, the whole of the lock mechanism 20L is not located outside the movement trajectory of the upper sheet cassette 20 (i.e., the first storage portion). That is, in a case where the lock mechanism 20L is in the unlocked state, at least a portion of the lock mechanism 20L is always put in the movement trajectory of the upper sheet cassette 20 (i.e., the first storage portion). In this configuration, a user can easily recognize that the lock mechanism 20L is in the unlocked state.

In addition, the lock member 204 includes a contacted portion 204*a* that is brought into contact with the contacting portion 20*a* of the sheet cassette 20. The contacted portion 204*a* is a portion that is brought into contact with the sheet cassette 20 in a case where the upper sheet cassette 20 (i.e., the first storage portion) is moved in a state where the lock member 204 is located at a position (i.e., a position indicated by a broken line in FIG. 5 or a position illustrated in FIG. 6) at which the claw portion 214 (i.e., an engaging portion) is separated from the engaged portion 215 to the maximum extent. In this configuration, a user can easily recognize that the lock mechanism 20L is in the unlocked state.

Note that in a case where the lock member 204 is located in the engagement position, the upper sheet cassette 20 does not overlaps with the lock member 204 when viewed in the moving direction (i.e., the front and back direction of the apparatus) of the upper sheet cassette 20. In other words, the lock member 204 located in the engagement position is retracted from the movement trajectory in which the upper sheet cassette 20 is attached to and drawn from the casing 220. That is, in a case where the lock mechanism 20L is in the locked state, the whole of the lock mechanism 20L is located outside the movement trajectory of the sheet cassette 20 in which the upper sheet cassette 20 (i.e., the first storage portion) is attached to and drawn from the casing 220 (i.e., the first casing). Thus, in a case where the lock mechanism 20L of the lower option feeding unit 200 is in the locked state, the upper sheet cassette 20 can move without interfering with the portion of the lock mechanism 20L.

The contacted portion 204*a* of the lock member 204 of the present embodiment is a projection portion that projects upward in a state where the lock member 204 is located in the separation position. In particular, the contacted portion 204*a* of the present embodiment projects upward more than the leading end of the claw portion 214 does, in a state where the lock member 204 is located in the separation position. The contacted portion 204*a* is disposed closer to the pivot shaft 204*b* than the claw portion 214 is. Since the force from the sheet cassette 20 is received by the contacted portion 204*a* that is disposed closer to the pivot shaft 204*b* than the claw portion 214 is, the possibility that the lock member 204 will be deformed or damaged can be reduced, compared with the possibility in a case where the force from the sheet cassette 20 is received by the claw portion 214, for example.

In the present embodiment, the contacting portion 20*a* is disposed in two positions. That is, one contacting portion 20*a* is disposed in the front end of the cassette body of the sheet cassette 20, and the other contacting portion 20*a* is disposed in the back end of the cassette body of the sheet cassette 20. As illustrated in FIG. 6, in a case where a user makes an attempt to draw the sheet cassette 20 of the upper option feeding unit 200 from the casing 220 in a state where the lock member 204 of the lower option feeding unit 200 is located in the separation position, the contacting portion 20*a* (i.e., a first contacting portion) of the front end of the sheet cassette 20 contacts the lock member 204 of the lower option feeding unit 200. As a result, the sheet cassette 20 is prevented from being drawn from the casing 220.

In addition, in a case where a user makes an attempt to attach the sheet cassette 20 of the upper option feeding unit 200 to the casing 220 in a state where the lock member 204 of the lower option feeding unit 200 is located in the separation position, the contacting portion 20*a* (i.e., a second contacting portion) of the back end of the sheet cassette 20 contacts the lock member 204 of the lower option feeding unit 200. As a result, the sheet cassette 20 is prevented from being attached to the casing 220.

As described above, in the present embodiment, the contacting portion 20*a* (i.e., the first contacting portion) is disposed on the upstream side in the drawing direction of the sheet cassette 20 (i.e., the storage portion or the first storage portion), and the contacting portion 20*a* (i.e., the second contacting portion) is disposed on the downstream side in the drawing direction of the sheet cassette 20.

Thus, the contacting portion 20*a* contacts the lock member 204 in both of operations: the operation for drawing the sheet cassette 20 and the operation for attaching the sheet cassette 20.

In this manner, a user can become aware that the lock mechanism 20L is in the unlocked state, because the user cannot normally perform the drawing and attaching operation (i.e., the cassette opening/closing operation).

Thus, the present embodiment can provide a sheet feeding apparatus and an image forming apparatus that makes it easier to recognize that the lock mechanism 20L is in the unlocked state. In addition, the present embodiment can prevent the image forming apparatus 1 from being used in a state where the lock mechanism 20L remains in the unlocked state, and allows the image forming apparatus 1 to be used in a state where the image forming apparatus 1 exhibits the intended stability:

First Modification

Figure 7:
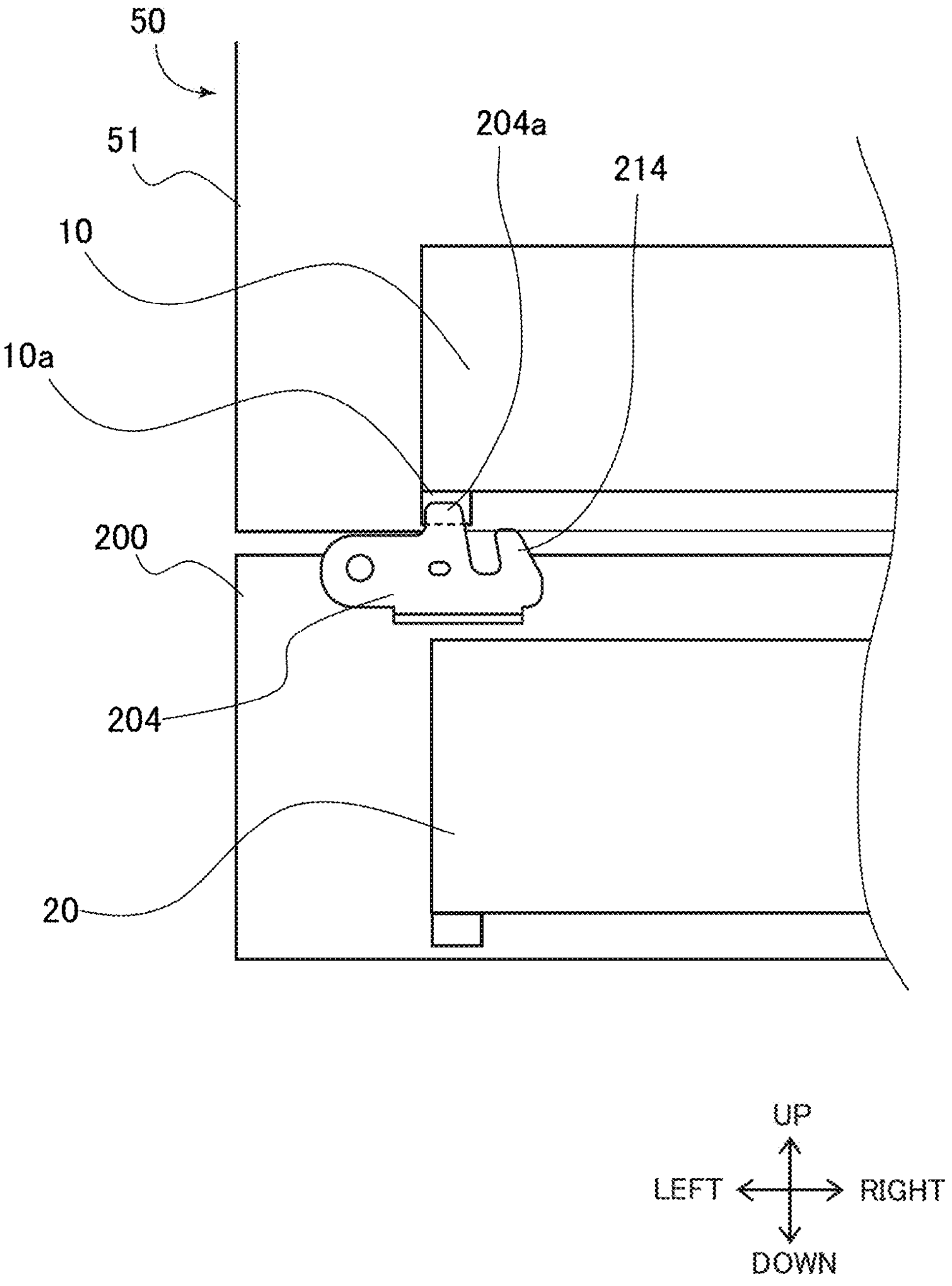
FIG. 7 is a diagram illustrating a contacting portion of a sheet cassette of a first modification.

In the configuration illustrated in FIG. 6, the contacting portion 20*a* disposed on the sheet cassette 20 of the upper option feeding unit 200 contacts the lock member 204 of the lower option feeding unit 200. However, the present disclosure is not limited to this. For example, as illustrated in FIG. 7, a contacting portion 10*a* that can contact the lock member 204 of the upper option feeding unit 200 may be disposed on the sheet cassette 10 of the printer unit 50. In this case, if the sheet cassette 10 is drawn from and attached to the body casing 51 of the printer unit 50 in a state where the lock mechanism 20L of the uppermost option feeding unit 200 remains in the unlocked state, the contacting portion 10*a* will contact the contacted portion. As a result, the sheet cassette 10 can be prevented from being attached to and drawn from the body casing 51 of the printer unit 50.

That is, the printer unit 50 (i.e., an image forming apparatus body) includes the main-body casing 51 (i.e., a first casing or an upper casing), and the sheet cassette 10 (i.e., a first storage portion or an upper storage portion) (FIG. 1). The sheet cassette 10 stores sheets, and is drawably attached to the main-body casing 51. The upper option feeding unit 200 (i.e., a feeding unit) includes the casing 220 (i.e., a second casing) connected under the main-body casing 51, the sheet cassette 20 (i.e., a second storage portion), and the lock mechanism 20L. The sheet cassette 20 stores sheets, and is drawably attached to the casing 220. The lock mechanism 20L switches between the locked state and the unlocked state. In the locked state, the lock mechanism 20L locks the main-body casing 51 (i.e., the first casing or the upper casing) and the casing 220 (i.e., the second casing or the casing) for preventing the main-body casing 51 and the casing 220 from being separated from each other. In the unlocked state, the lock mechanism 20L allows the main-body casing 51 and the casing 220 to be separated from each other. The sheet cassette 10 (i.e., the first storage portion) of the printer unit 50 includes the contacting portion 10*a* that contacts a portion of the lock mechanism 20L in a case where the sheet cassette 10 is moved in a state where the lock mechanism 20L is in the unlocked state.

Also in the present modification, as in the first embodiment, a user can easily recognize that the lock mechanism 20L is in the unlocked state. Note that as in the first embodiment, the contacting portion 10*a* may be disposed in two positions. That is, one contacting portion 10*a* (i.e., a first contacting portion) may be disposed on the front side of the sheet cassette 10, and the other contacting portion 10*a* (i.e., a second contacting portion) may be disposed on the back side of the sheet cassette 10.

Second Modification

Figure 8:
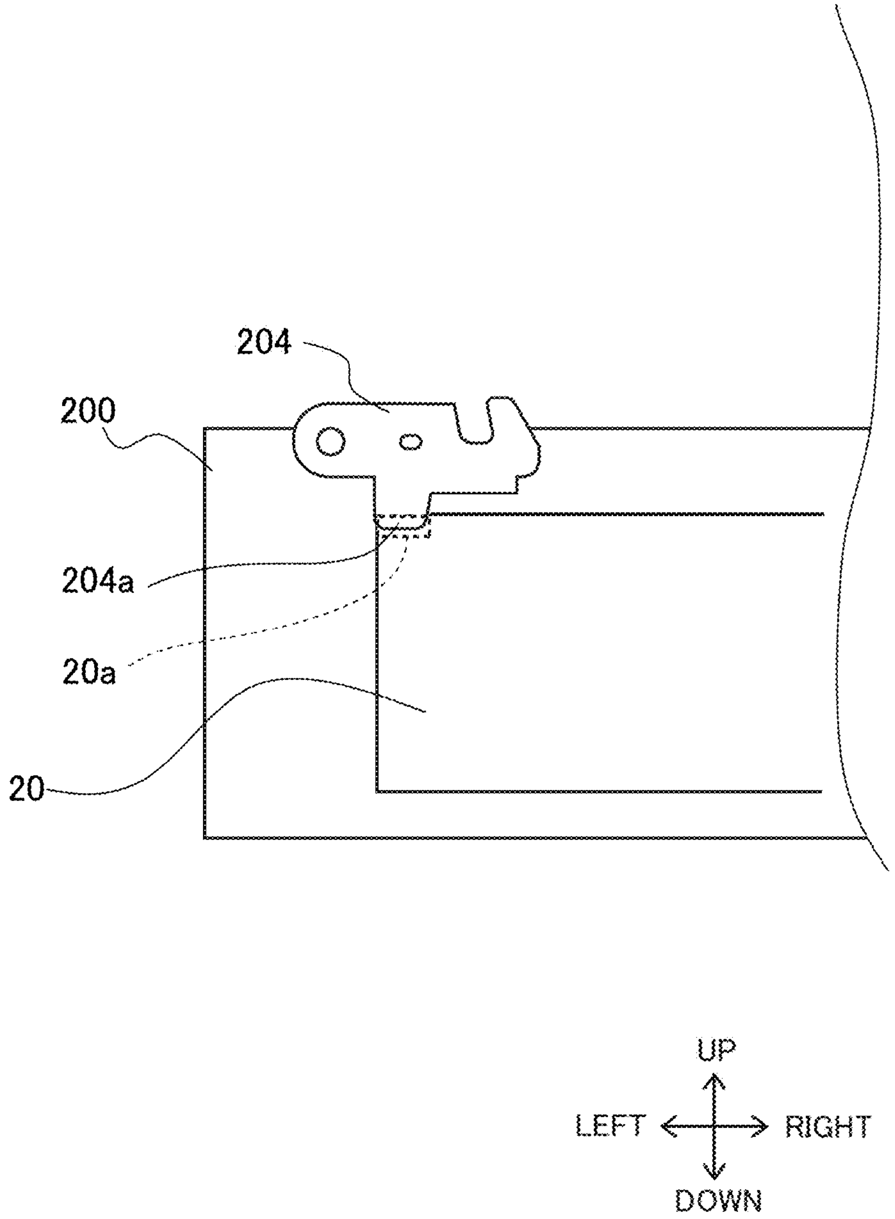
FIG. 8 is a diagram illustrating a contacting portion of a sheet cassette of a second modification.

As illustrated in FIG. 8, a contacting portion 20*a* disposed on a sheet cassette 20 may contact the lock member 204 of the option feeding unit 200 that includes the sheet cassette 20. For example, the contacting portion 20*a* of the sheet cassette 20 of the lower option feeding unit 200 may contact the contacted portion 204*a* of the lock member 204 of the lower option feeding unit 200.

That is, the option feeding unit 200 (i.e., a feeding unit or first feeding unit) includes the casing 220 that can be connected with the printer unit 50 (i.e., an image forming apparatus body) or another option feeding unit 200 (i.e., another feeding unit or second feeing unit) that constitutes a sheet feeding apparatus together with the option feeding unit 200 as the first feeding unit. In addition, the option feeding unit 200 (i.e., a feeding unit) includes the sheet cassette 20 (i.e., a storage portion) and the lock mechanism 20L. The sheet cassette 20 stores sheets, and is drawably attached to the casing 220. The lock mechanism 20L switches between the locked state and the unlocked state. In the locked state, the lock mechanism 20L locks the casing 220 and the printer unit 50 or the other option feeding unit 200 for preventing them from being separated from each other. In the unlocked state, the lock mechanism 20L allows both of them to be separated from each other. The sheet cassette 20 (i.e., a storage portion) includes the contacting portion 20*a* that contacts a portion of the lock mechanism 20L in a case where the sheet cassette 20 is moved in a state where the lock mechanism 20L is in the unlocked state.

Also in the present modification, as in the first embodiment, a user can easily recognize that the lock mechanism 20L is in the unlocked state. Note that as in the first embodiment, the contacting portion 20*a* may be disposed in two positions. That is, one contacting portion 20*a* (i.e., a first contacting portion) may be disposed on the front side of the sheet cassette 20, and the other contacting portion 20*a* (i.e., a second contacting portion) may be disposed on the back side of the sheet cassette 20.

Other Modifications

The arrangement and number of the contacting portions 20*a* may be changed as appropriate. For example, the contacting portions 20*a* may be disposed on both sides (i.e., the right side and the left side) of the sheet cassette 20, and one of the two contacting portions 20*a* may contact the left lock member 204, and the other of the two contacting portions 20*a* may contact the right lock member 205.

In another case, the contacting portion 20*a* may contact another portion of the lock mechanism 20L other than the lock members 204 to 206. For example, a projecting portion that serves as the contacted portion may be disposed on the slider 211 or the connecting rod 212 (FIG. 4A), and the contacting portion 20*a* may contact the projecting portion in a case where the sheet cassette 20 is drawn from and attached to the casing 220 in a state where the lock mechanism 20L remains in the unlocked state.

Other Examples

In the above-described embodiments, the description has been made for the image forming apparatus 1 that includes an intermediate-transfer electrophotographic unit that serves as the image forming portion 52. However, the image forming portion 52 is not limited to this. For example, the image forming portion 52 may be a direct-transfer electrophotographic unit that directly transfers a toner image from the photosensitive drum to the sheet S, not via the intermediate transfer member. In another case, the image forming portion 52 may be an image forming unit (i.e., a print unit), such as an ink-jet unit, other than the electrophotographic unit.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-024893, filed Feb. 21, 2024, which is hereby incorporated by reference herein in its entirety.

What is claimed is:

1. A sheet feeding apparatus comprising:

a casing configured to be connected under an upper casing to which an upper storage portion is drawably attached;

a storage portion configured to store a sheet and drawably attached to the casing; and a lock mechanism configured to switch between a locked state, in which the lock mechanism locks the casing and the upper casing to prevent the casing and the upper casing from being separated from each other, and an unlocked state, in which the lock mechanism allows the casing and the upper casing to be separated from each other, wherein in a case where the lock mechanism is in the locked state, a whole of the lock mechanism is positioned outside a movement trajectory of the upper storage portion in which the upper storage portion is attached to and drawn from the upper casing, and wherein in a case where the lock mechanism is in the unlocked state, at least a portion of the lock mechanism is positioned inside the movement trajectory of the upper storage portion.

2. The sheet feeding apparatus according to claim 1, wherein the lock mechanism includes a lock member including an engaging portion configured to engage with an engaged portion provided in the upper casing, the lock member being configured to move such that the engaging portion approaches and moves away from the engaged portion, and wherein in a case where the engaging portion is separated from the engaged portion, at least a portion of the lock member is always positioned inside the movement trajectory of the upper storage portion.

3. The sheet feeding apparatus according to claim 2, wherein in a case where the lock mechanism is in the unlocked state, the lock member is positioned to be brought into contact with the upper storage portion to prevent the upper storage portion from being drawn from and attached to the upper casing.

4. The sheet feeding apparatus according to claim 2, wherein the lock member is configured to pivot around a pivot shaft and includes a contacted portion configured to be brought into contact with the upper storage portion in a case where the upper storage portion is moved in a state where the lock mechanism is in the unlocked state, and wherein the contacted portion is disposed closer to the pivot shaft than the engaging portion is.

5. The sheet feeding apparatus according to claim 1, wherein the upper storage portion includes:

a first contacting portion configured to contact a portion of the lock mechanism when an attempt is made to move the upper storage portion drawn out from the upper casing in an attachment direction; and a second contacting portion disposed downstream of the first contacting portion in a drawing direction of the upper storage portion and configured to contact a portion of the lock mechanism when an attempt is made to move the upper storage portion attached to the upper casing in the drawing direction.

6. The sheet feeding apparatus according to claim 1, further comprising:

an upper unit including the upper casing and the upper storage portion, wherein the upper unit is another sheet feeding apparatus that is connected to an image forming apparatus body configured to form an image on a sheet and that is configured to feed a sheet toward the image forming apparatus body.

7. An image forming apparatus comprising:

the sheet feeding apparatus according to claim 1; and an image forming apparatus body including the upper casing, the upper storage portion, and an image forming portion configured to form an image on a sheet fed from the storage portion or the upper storage portion.

8. A sheet feeding apparatus comprising:

a casing configured to be connected under an upper casing to which an upper storage portion is drawably attached;

a storage portion configured to store a sheet and drawably attached to the casing; and a lock mechanism configured to switch between a locked state, in which the lock mechanism locks the casing and the upper casing to prevent the casing and the upper casing from being separated from each other, and an unlocked state, in which the lock mechanism allows the casing and the upper casing to be separated from each other, wherein the lock mechanism includes a lock member including an engaging portion configured to engage with an engaged portion provided in the upper casing, the lock member being configured to move such that the engaging portion approaches and moves away from the engaged portion, and wherein the lock member includes a contacted portion configured to be brought into contact with the upper storage portion in a case where the upper storage portion is moved in a state where the lock member is located at a position at which the engaging portion is separated from the engaged portion to a maximum extent.

9. The sheet feeding apparatus according to claim 8, wherein in a case where the lock mechanism is in the unlocked state, the lock member is positioned to be brought into contact with the upper storage portion to prevent the upper storage portion from being drawn from and attached to the upper casing.

10. The sheet feeding apparatus according to claim 8, wherein the lock member is configured to pivot around a pivot shaft, and wherein the contacted portion is disposed closer to the pivot shaft than the engaging portion is.

11. The sheet feeding apparatus according to claim 8, wherein the upper storage portion includes:

a first contacting portion configured to contact a portion of the lock member when an attempt is made to move the upper storage portion drawn out from the upper casing in an attachment direction; and a second contacting portion disposed downstream of the first contacting portion in a drawing direction of the upper storage portion and configured to contact the lock member when an attempt is made to move the upper storage portion attached to the upper casing in the drawing direction.

12. The sheet feeding apparatus according to claim 8, further comprising:

an upper unit including the upper casing and the upper storage portion, wherein the upper unit is another sheet feeding apparatus that is connected to an image forming apparatus body configured to form an image on a sheet and that is configured to feed a sheet toward the image forming apparatus body.

13. An image forming apparatus comprising:

the sheet feeding apparatus according to claim 8; and an image forming apparatus body including the upper casing, the upper storage portion, and an image forming portion configured to form an image on a sheet fed from the storage portion or the upper storage portion.

14. A sheet feeding apparatus comprising:

a casing configured to be connected under an upper casing to which an upper storage portion is drawably attached;

a storage portion configured to store a sheet and drawably attached to the casing; and a lock mechanism configured to switch between a locked state, in which the lock mechanism locks the casing and the upper casing to prevent the casing and the upper casing from being separated from each other, and an unlocked state, in which the lock mechanism allows the casing and the upper casing to be separated from each other, wherein in a case where the lock mechanism is in the locked state, a whole of the lock mechanism is positioned outside a movement trajectory of the storage portion in which the storage portion is attached to and drawn from the casing, and wherein in a case where the lock mechanism is in the unlocked state, at least a portion of the lock mechanism is positioned inside the movement trajectory of the storage portion.

15. The sheet feeding apparatus according to claim 14, wherein the lock mechanism includes a lock member including an engaging portion configured to engage with an engaged portion provided in the upper casing, the lock member being configured to move such that the engaging portion approaches and moves away from the engaged portion, and wherein in a case where the engaging portion is separated from the engaged portion, at least a portion of the lock member is always positioned inside the movement trajectory of the storage portion.

16. The sheet feeding apparatus according to claim 15, wherein in a case where the lock mechanism is in the unlocked state, the lock member is positioned to be brought into contact with the storage portion to prevent the storage portion from being drawn from and attached to the casing.

17. The sheet feeding apparatus according to claim 15, wherein the lock member is configured to pivot around a pivot shaft and includes a contacted portion configured to be brought into contact with the storage portion in a case where the storage portion is moved in a state where the lock mechanism is in the unlocked state, and wherein the contacted portion is disposed closer to the pivot shaft than the engaging portion is.

18. The sheet feeding apparatus according to claim 14, wherein the storage portion includes:

a first contacting portion configured to contact a portion of the lock mechanism an attempt is made to move the storage portion drawn out from the casing in an attachment direction; and a second contacting portion disposed downstream of the first contacting portion in a drawing direction of the storage portion and configured to contact a portion of the lock mechanism when an attempt is made to move the storage portion attached to the casing in the drawing direction.

19. The sheet feeding apparatus according to claim 14, further comprising:

an upper unit including the upper casing and the upper storage portion, wherein the upper unit is another sheet feeding apparatus that is connected to an image forming apparatus body configured to form an image on a sheet and that is configured to feed a sheet toward the image forming apparatus body.

20. An image forming apparatus comprising:

the sheet feeding apparatus according to claim 14; and an image forming apparatus body including the upper casing, the upper storage portion, and an image forming portion configured to form an image on a sheet fed from the storage portion or the upper storage portion.

* * * * *